(12) United States Patent
Elias

(10) Patent No.: US 11,231,640 B2
(45) Date of Patent: Jan. 25, 2022

(54) CAMERA HOLDER

(71) Applicant: James Harrison Elias, Kolbermoor (DE)

(72) Inventor: James Harrison Elias, Kolbermoor (DE)

( * ) Notice: Subject to any disclaimer, the term of this patent is extended or adjusted under 35 U.S.C. 154(b) by 0 days.

(21) Appl. No.: 16/379,867

(22) Filed: Apr. 10, 2019

(65) Prior Publication Data

US 2019/0302577 A1    Oct. 3, 2019

Related U.S. Application Data

(63) Continuation of application No. PCT/US2017/056241, filed on Oct. 12, 2017.

(60) Provisional application No. 62/407,021, filed on Oct. 12, 2016.

(51) Int. Cl.
| | |
|---|---|
| *G03B 17/56* | (2021.01) |
| *F16M 11/04* | (2006.01) |
| *F16M 11/14* | (2006.01) |
| *A45C 11/38* | (2006.01) |
| *F16M 13/00* | (2006.01) |

(52) U.S. Cl.
CPC ............ *G03B 17/561* (2013.01); *A45C 11/38* (2013.01); *F16M 11/041* (2013.01); *F16M 11/14* (2013.01); *F16M 13/00* (2013.01); *G03B 17/566* (2013.01)

(58) Field of Classification Search
CPC .... G03B 17/56; G03B 17/561; G03B 17/566; G03B 17/563; F16M 13/00; F16M 11/041; F16M 11/14; F16M 11/04; F16M 11/16; F16M 13/02; F16M 13/022; F16M 13/04; H04N 5/247; A45C 11/38

USPC ............................................. 396/423
See application file for complete search history.

(56) References Cited

U.S. PATENT DOCUMENTS

| | | | |
|---|---|---|---|
| 2004/0174457 A1* | 9/2004 | Ma ........................ | A44B 11/125 348/373 |
| 2007/0130813 A1 | 6/2007 | Stacy | |
| 2010/0254014 A1* | 10/2010 | Trinh ..................... | B60K 37/00 359/601 |
| 2011/0097069 A1 | 4/2011 | Braithwaite | |
| 2012/0301129 A1 | 11/2012 | Smith | |
| 2013/0107111 A1 | 5/2013 | Campbell et al. | |
| 2013/0294020 A1* | 11/2013 | Rayner ................. | G06F 1/1626 361/679.01 |

(Continued)

FOREIGN PATENT DOCUMENTS

WO    WO2014141873    9/2014

OTHER PUBLICATIONS

First Ever GoPro Camera, Pavle; http://pevty.com/first-ever-gopro-camera-hero-35-mm-full-story, Jan. 16, 2016; 19 pages, Feb. 2, 2002.

(Continued)

*Primary Examiner* — Clayton E. LaBalle
*Assistant Examiner* — Fang-Chi Chang
(74) *Attorney, Agent, or Firm* — Michael J. Nickerson; Basch & Nickerson LLP

(57) ABSTRACT

A camera mount includes a lower mount component comprising a rigid tray; and an elastic retaining member fastened to the tray such that it arches over the tray cavity. The elastic retaining member includes a first relief indentation to prevent the elastic retaining member from causing unwanted interaction with a camera.

14 Claims, 12 Drawing Sheets

(56) References Cited

U.S. PATENT DOCUMENTS

| | | | |
|---|---|---|---|
| 2014/0252188 A1* | 9/2014 | Webster | F16M 11/06 |
| | | | 248/229.17 |
| 2014/0366357 A1* | 12/2014 | Haarburger | F16M 11/041 |
| | | | 29/428 |
| 2016/0077409 A1* | 3/2016 | Samuels | G03B 17/561 |
| | | | 396/27 |
| 2016/0116828 A1 | 4/2016 | Clearman | |
| 2016/0381259 A1* | 12/2016 | Johnson | F16M 13/04 |
| | | | 348/158 |

OTHER PUBLICATIONS

History and Evolution of Action Cameras, Pavle; http:pevly.com/action-camera-history/, Nov. 4, 2015, 33 pages. Feb. 2, 2002.

Layer Lens GoPro Lens Protection for GoPro 3 & 4; http://ww.getfpv.com/layerlens-fo-gopro3.html; Oct. 12, 2016; 2 pages. Feb. 2, 2002.

GoPro 3 lens protection with strap slot (QS5AD8WX4) by mobilexcopter; http://www.shapeways.com/product/QS5AD8WX4/gopro-3-lens-protect; Oct. 12, 2016; 3 pages. Feb. 2, 2002.

International Search Report and Written Opinion for PCT/US2017/056241 dated Feb. 9, 2018.

International Preliminary Report on Patentability for PCT/US2017/056241 dated Apr. 25, 2019.

\* cited by examiner

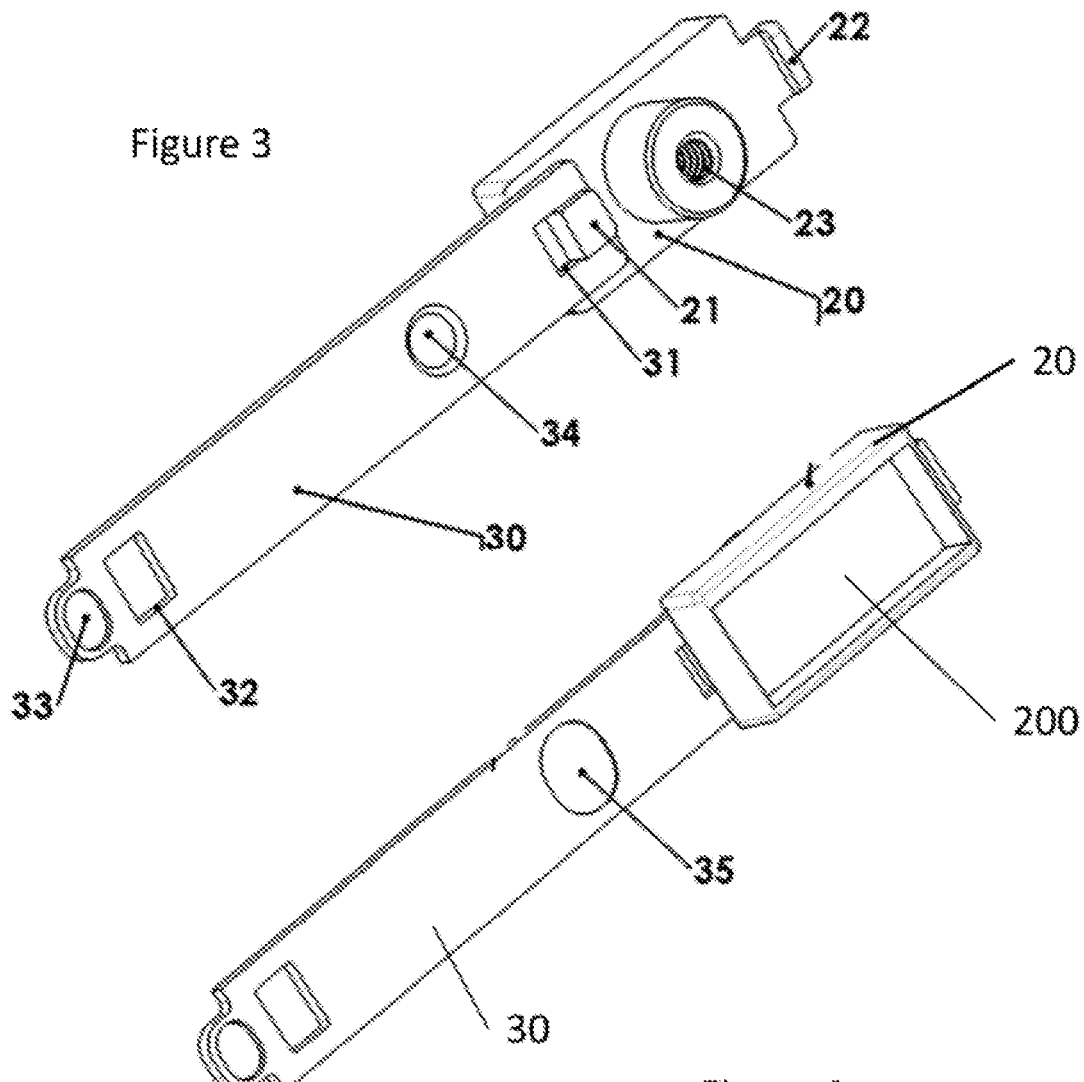

CAMERA HOLDER

PRIORITY INFORMATION

The present application is a continuation application of PCT patent application Ser. No. PCT/US2017/056241 and claims priority, under 35 U.S.C. § 120, from PCT patent application No. PCT/US2017/056241, filed on Oct. 12, 2017, said PCT patent application No. PCT/US2017/056241, filed on Oct. 12, 2017, claiming priority, under 35 U.S.C. § 119(e), from U.S. Provisional Patent Application, Ser. No. 62/407,021, filed on Oct. 12, 2016. The entire content of PCT patent application No. PCT/US2017/056241, filed on Oct. 12, 2017, is hereby incorporated by reference.

This application claims priority from U.S. Provisional Patent Application, Ser. No. 62/407,021, filed on Oct. 12, 2016. The entire content of U.S. Provisional Patent Application, Ser. No. 62/407,021, filed on Oct. 12, 2016, is hereby incorporated by reference.

BACKGROUND

The use of compact cameras, originally intended for use in sports videography, has expanded into other non-sports videography applications due to the cameras allowing for very high image quality while remaining small, light and convenient to carry.

Since the needs of sports videography are extremely diverse and continually evolving, the cameras are designed to be as small as possible, with no allocation for providing attachment to traditional camera mounting elements such as threads.

As such conventional mounting of such compact cameras utilize an additional mounting or secondary housing unit, conventionally in the form of a fully-enveloping frame.

Conventional mounting units are largely based on the needs of the sports-oriented original market for compact cameras; however, such conventional mounts are mainly intended to assure the rigid mounting of the compact camera to fast-moving objects, and operational issues such as fast access to battery compartments or cable sockets have been considered secondary importance.

The importance of absolute rigidity of mounting versus fast access are of equal importance when it comes to many non-sports applications In these applications, the fastening of the compact cameras to non-moving external supporting objects conventionally involves fastening the compact cameras to tripods or scaffolds.

In particular, the fully-enveloping, tightly-fitted nature of such mounts as required for their conventional customary functions make it cumbersome to remove and re-insert the camera as must often be done, for example, in the case of replacing an exhausted battery.

Therefore, it is desirable to provide a camera mount that utilizes an elastic retaining component that can be quickly released allowing ready access to the compartments of the compact camera when needed.

It is further desirable to provide a camera mount that utilizes an elastic retaining component that quickly re-engages when the compact camera is to be put back into use.

BRIEF DESCRIPTION OF THE DRAWINGS

The drawings are only for purposes of illustrating various embodiments and are not to be construed as limiting, wherein:

FIG. 3 shows a top perspective view of a camera mount for a compact camera;

FIG. 4 shows a bottom perspective view of a camera mount for a compact camera;

DETAILED DESCRIPTION OF THE DRAWINGS

Figure 1:
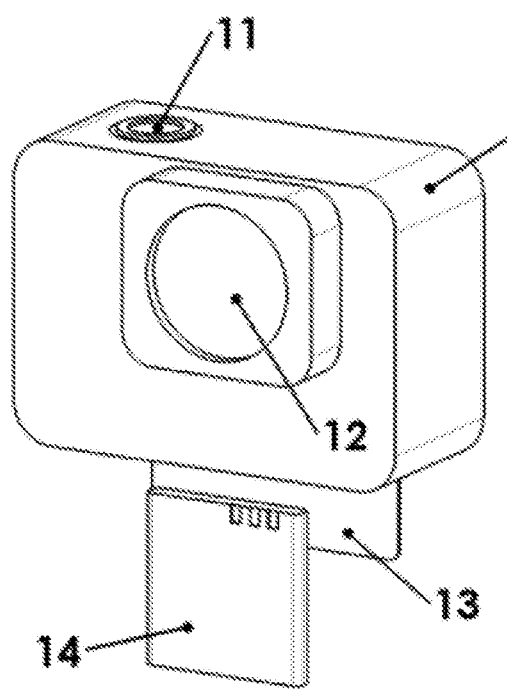
FIG. 1 shows a front perspective view of a compact camera.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates a front perspective of a conventional a compact camera 10 with an operating button switch 11, a lens 12, a hinged battery hatch 13, and a removable battery 14.

Figure 2:
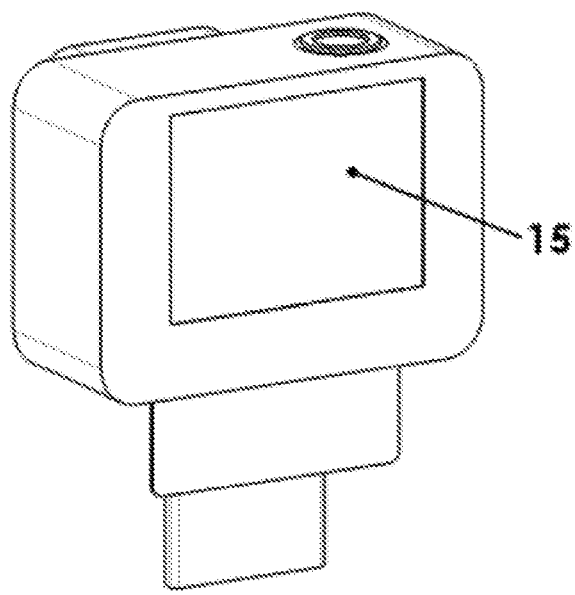
FIG. 2 shows a rear perspective view of a compact camera.

FIG. 2 illustrates a rear perspective of the conventional a compact camera 10 of FIG. 1 with a viewing monitor 15.

FIG. 3 shows a top perspective view of a camera mount for a conventional compact camera, as illustrated in FIGS. 1 and 2. As illustrated in FIG. 3, the camera mount includes a tray component 20. It is noted that the tray component 20 may be rigid.

The tray component 20 includes, at opposing ends, hooks 21 and 22. The hooks 21 and 22 may be integral to the tray component 20, or the hooks 21 and 22 may be attachable/detachable the tray component 20.

As illustrated in FIG. 3, the tray component 20 also includes attachment thread 23 (attachment interface). It is noted that the attachment thread 23 may be replaced with other conventional interfaces that would allow the camera mount to attach to a conventional camera support mount, such as a ball head or a flat plate of a conventional tripod or conventional scaffold.

The tray component 20 additionally includes retaining component 30. It is noted that the retaining component 30 may be constructed of an elastic material and be configured in the form of a strap. As illustrated, the retaining component 30 includes opening 31 and 32, which are configured to engage hooks 21 and 22 so as to provide an attachment function.

The retaining component 30 also includes a pull-tab 33. The pull-tab 33 may be optionally formed with a gripping feature (topography).

As illustrated in FIG. 4, the tray component 20 is configured to include an opening or recess portion 200 to receive a conventional compact camera therein. The opening or recess portion 200 of the tray component 20 may optionally include dampening or expandable material to provide a secure engagement between the opening or recess portion 200 of the tray component 20 and the conventional compact camera. For example, a rubber pad may be located on the floor of the opening or recess portion 200 of the tray component 20 to provide a secure engagement between the opening or recess portion 200 of the tray component 20 and the conventional compact camera.

In preparing the camera mount for utilization in securing a compact camera to a conventional camera support mount, such as a ball head or a flat plate of a conventional tripod or conventional scaffold, the opening 31 is engaged with the hook 21. It is noted that the configuration of the opening 31 and the hook 21 is such that the retaining component 30 is anchored to the tray component 20 at this point and cannot be removed without substantial effort.

It is noted that the thread 23 of FIG. 3 is a standard thread as found on conventional camera (videographic and photographic) support mounts, such as conventional ball heads or flat plates.

The retaining component 30 may include one or more relief features 34, as illustrated in FIG. 3, to aid in identifying the positions of operating elements such as the button switch 11 of FIG. 1.

It is further noted, as illustrated in FIG. 4, coincidence to features 34, the retaining component 30 may include one or more relief features 35 on its surface facing towards the compact camera housing to prevent the retaining component 30 from causing unwanted activation through contact with operating elements, such as the button switch 11 of FIG. 1.

Figure 5:
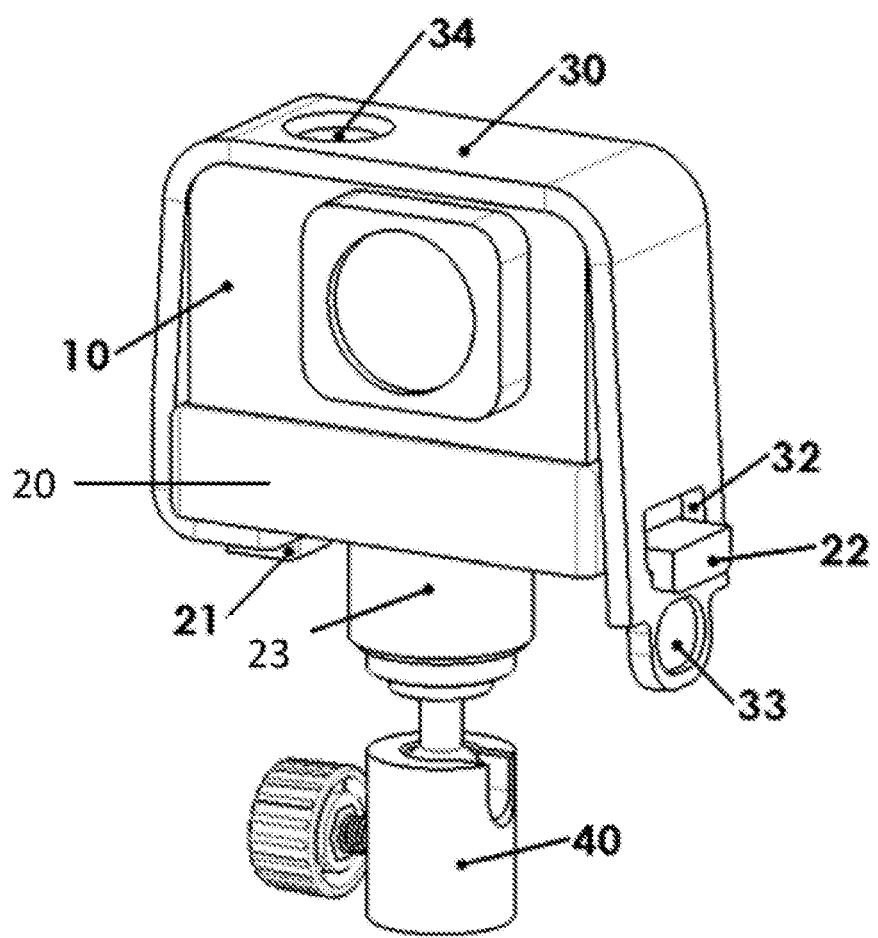
FIG. 5 illustrates utilization of a camera mount to secure a compact camera to a conventional camera ball head.

As illustrated in FIG. 5, the tray component 20 is mounted, via the thread 23, to a conventional camera support mount 40, such as a conventional ball head or flat plate. The opening 32 has been engaged with the hook 22. It is noted that the configuration of the opening 32 and the hook 22 is such that the retaining component 30 is anchored to the tray component 20 at this point and cannot be removed without substantial effort.

It is noted that the direction of engagement between the opening 32 and the hook 22 is thus parallel to the orientation of the pull-tab 33.

The operating element relief feature 34 is located coincidence to the button switch 11 of FIG. 1.

If access is needed to the battery hatch 13 of FIG. 1; for example, to replace the battery 14, the operator disengages the opening 32 from hook 22, by pulling the tab 33 in a downward direction and then outward direction to free the camera 10.

Due to the configuration of the engagement the hook 21 and opening 31, the retaining component 30 remains attached to the tray component 20 even when the opening 32 is disengaged from the hook 22.

Figure 6:
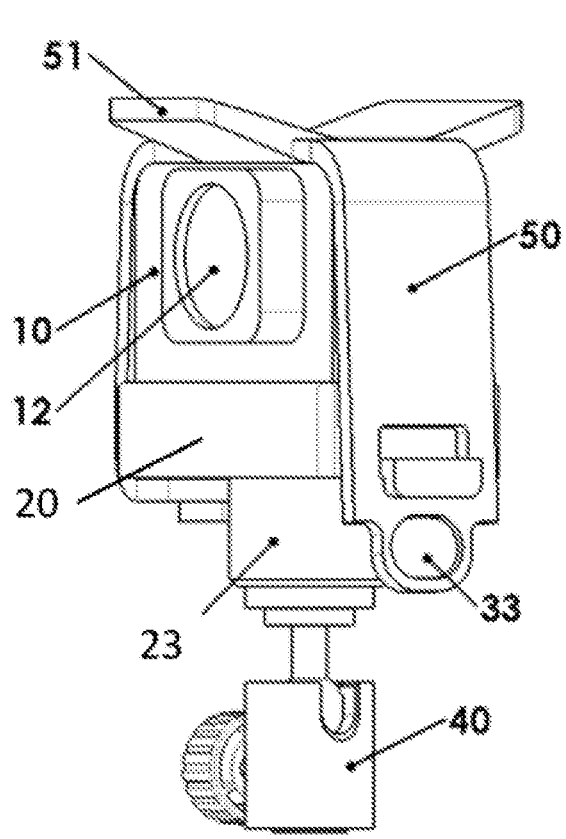
FIG. 6 shows a front perspective view of a camera mount for a compact camera having shade flaps for the lens and viewfinder (display screen) of the compact camera.
Figure 7:
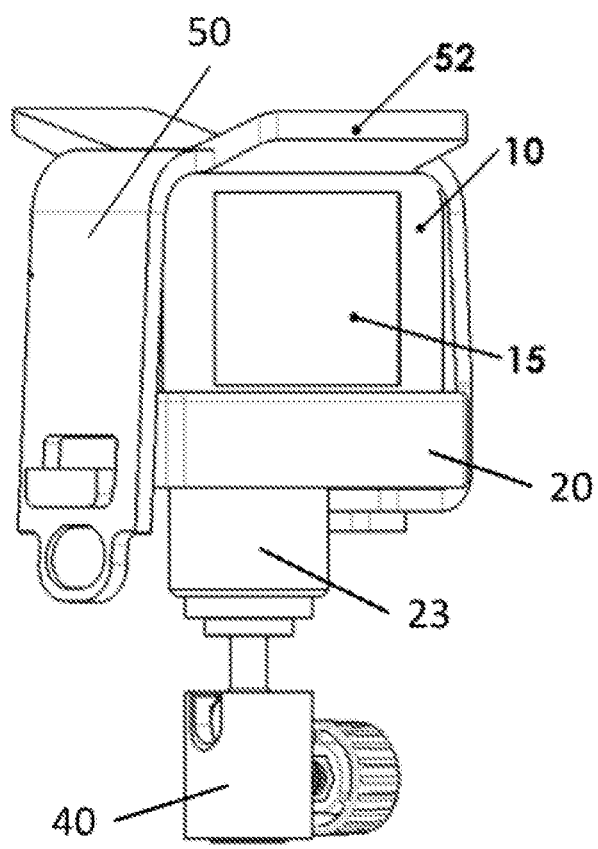
FIG. 7 shows a rear perspective view of a camera mount for a compact camera having integral shade flaps for the lens and viewfinder (display screen) of the compact camera.

FIGS. 6 and 7 illustrate an alternative embodiment of the retaining component. As illustrated in FIG. 6, the retaining component 50 includes a flap feature 51 to block unwanted stray light from falling on the lens 12 of the camera 10. It is noted that the flap feature 51 may be integral with the retaining component 50. Such unwanted stray light falling on the lens 12 would cause deleterious effects commonly known as "flare" in the acquired image.

As illustrated in FIG. 7, the retaining component 50 includes a flap feature 52 to block unwanted stray light from falling on the viewing monitor (display) 15 of the camera 10. It is noted that the flap feature 52 may be integral with the retaining component 50. Such unwanted stray light falling on the viewing monitor 15 would reflect and cause difficulty in viewing the image on the viewing monitor 15.

Figure 8:
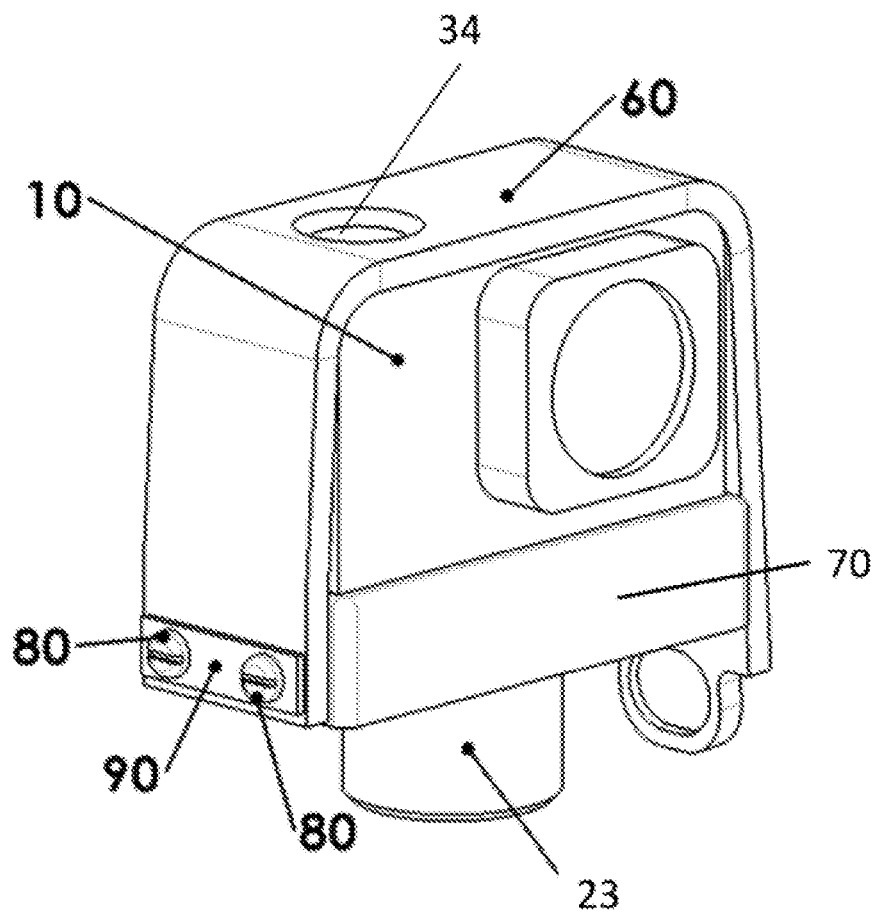
FIG. 8 is a side perspective view of another embodiment of a camera mount for a compact camera.

FIG. 8 illustrates an alternative embodiment wherein a retaining component 60 is attached at an anchor end to tray component 70 by means of screws 80 and a retaining plate 90.

In this embodiment, the retaining component 60 would include through-holes and the tray component 70 would include appropriate attachment threads.

For applications wherein a camera is being mounted to a stationary or relatively slow-moving support to record such as events or presentations, the camera mount allows for easy and rapid removal of a camera as necessary and equally easy replacement and re-securing of the camera after the necessary maintenance operations have been performed.

Furthermore, in reference to the elastic and detachable aspects of the retaining component, these aspects allow the retaining component to be swapped immediately should it fail due to damage.

In addition, in reference to the shade flaps of the retaining component, the shade flaps can be utilized in specific image acquisition situations, for example, when excessive unwanted stray light would be troublesome.

Figure 9:
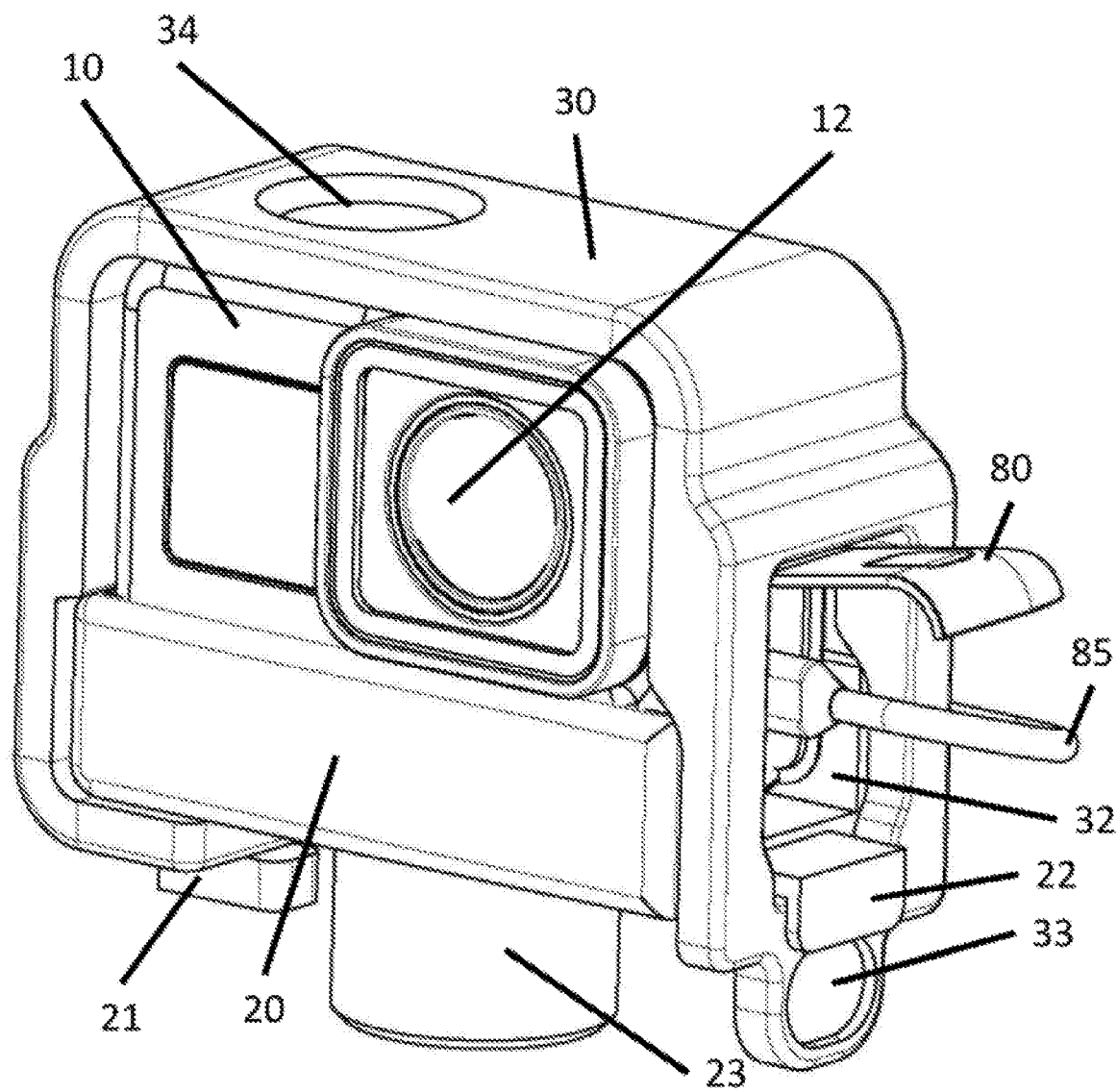
FIG. 9 illustrates another embodiment of a camera mount for a compact camera, wherein an opening is configured to enable opening of a cable-port access door on the compact camera.

FIG. 9 illustrates another embodiment of a camera mount for a compact camera 10 having a lens 12. As illustrated in FIG. 9, the camera mount includes a tray component 20. It is noted that the tray component 20 may be rigid.

As illustrated in FIG. 9, the tray component 20 also includes attachment thread 23. It is noted that the attachment thread 23 may be replaced with other conventional interfaces that would allow the camera mount to attach to a conventional camera support mount, such as a ball head or a flat plate of a conventional tripod or conventional scaffold.

The retaining component 30 further includes an opening 32 that enables a cable-port access door 80 of the camera 10 to be opened while the retaining component 30 is engaged with or attached to the tray component 20.

It noted that FIG. 9 illustrates the cable-port access door 80 in an opened state, with the cable-port access door 80 traversing outwardly through the opening 32. The opening 32 is configured to allow the opening and closing of the cable-port access door 80 while the retaining component 30 is engaged with or attached to the tray component 20.

As illustrated in FIG. 9, the tray component 20 includes, at one end, hook 21, and, at the other opposing end, hook 22. The hooks 21 and 22 may be integral to the tray component 20, or the hooks 21 and 22 may be attachable/detachable the tray component 20.

As illustrated in FIG. 9, the camera mount additionally includes retaining component 30. It is noted that the retaining component 30 may be constructed of an elastic material and be configured in the form of a strap. The retaining component 30 also includes a pull-tab 33 and an opening 32 to engage the hook 22 and to provide an opening to allow a cable 85 to gain access to the camera 10 so that the cable 85 can be connected to the camera 10. The pull-tab 33 may be optionally formed with a gripping feature (topography). The retaining component 30 may include one or more relief features 34, as illustrated in FIG. 9, to aid in identifying the positions of operating elements of the camera 10.

In another embodiment, it is noted that the retaining component 30 could include a rigid component in the opening 32 to provide a locking clamp. When the locking clamp is in a closed state, the locking clamp would enhance the strength of the attachment between the retaining component and the tray component.

When the locking clamp is in a closed state, the locking clamp would create more strain upon the retaining component, thereby strengthening the attachment between the retaining component and the tray component; i.e., strengthening the attachment between the opening 32 of the retaining component 30 and the corresponding hook 22 of the tray component 20.

When the locking clamp is in an opened state, the locking clamp would enhance the facilitation of the detaching of the retaining component from the tray component or enhances the facilitation of the attaching of the retaining component to the tray component.

When the locking clamp is in an opened state, the locking clamp would relieve the strain upon the retaining component, thereby weakening the attachment between the retaining component and the tray component to allow easy detachment; i.e., weakening the attachment between the opening 32 of the retaining component 30 and the corresponding hook 22 of the tray component 20.

Figure 10:
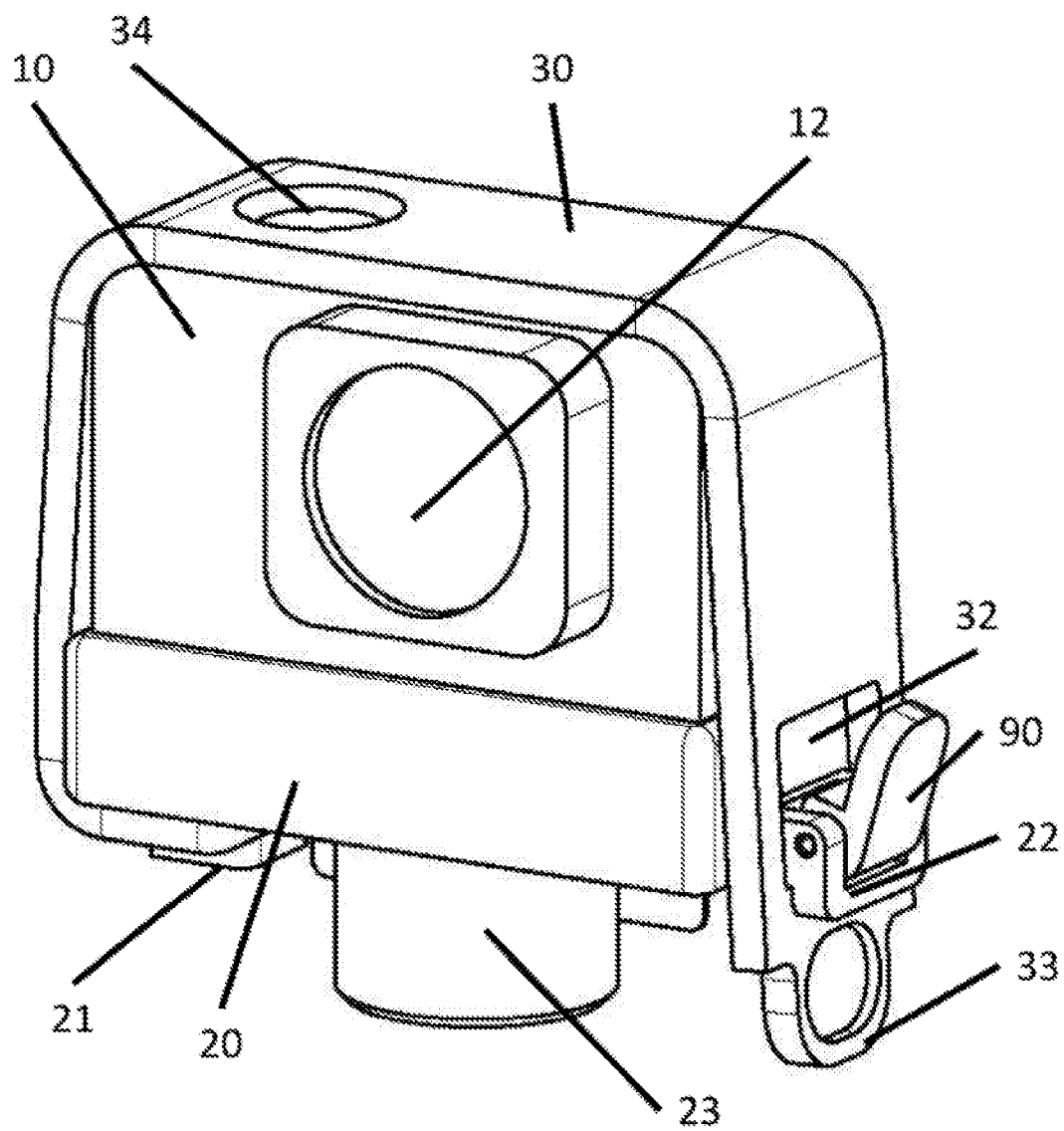
FIG. 10 illustrates a third embodiment of a camera mount for a compact camera.

FIG. 10 illustrates another embodiment of a camera mount for a compact camera 10 having a lens 12. As illustrated in FIG. 10, the camera mount includes a tray component 20. It is noted that the tray component 20 may be rigid. The tray component 20 includes, at one end, hook 21, and at an opposing end, hook 22. The hooks 21 and 22 may be integral to the tray component 20, or the hooks 21 and 22 may be attachable/detachable the tray component 20.

As illustrated in FIG. 10, the tray component 20 also includes attachment thread 23. It is noted that the attachment thread 23 may be replaced with other conventional interfaces that would allow the camera mount to attach to a conventional camera support mount, such as a ball head or a flat plate of a conventional tripod or conventional scaffold.

The camera mount additionally includes retaining component 30. It is noted that the retaining component 30 may be constructed of an elastic material and be configured in the form of a strap. The retaining component 30 also includes a pull-tab 33. The pull-tab 33 may be optionally formed with a gripping feature (topography). The retaining component 30 may include one or more relief features 34, as illustrated in FIG. 10, to aid in identifying the positions of operating elements of the camera 10.

The hook 22 further includes a locking clamp 90, which, when in a closed state, enhances the strength of the attachment between the retaining component 30 and the tray component 20.

When the locking clamp 90 is in a closed state, the locking clamp 90 creates more strain upon the retaining component 30, thereby strengthening the attachment between the retaining component 30 and the tray component 20; i.e., strengthening the attachment between the opening 32 of the retaining component 30 and the corresponding hook 22 of the tray component 20.

It noted that FIG. 10 illustrates the locking clamp 90 in an opened state, which enhances the facilitation of the detaching of the retaining component 30 from the tray component 20 or enhances the facilitation of the attaching of the retaining component 30 from the tray component 20.

When the locking clamp 90 is in an opened state, the locking clamp 90 relieves the strain upon the retaining component 30, thereby weakening the attachment between the retaining component 30 and the tray component 20; i.e., weakening the attachment between the opening 32 of the retaining component 30 and the corresponding hook 22 of the tray component 20.

It is noted that although in the various embodiments described above, the attachment interface (attachment threads 23) between the tray component of the camera mount has be illustrated and described as being threads that allows for attachment to a bolt-like interface in a support platform, it is contemplated that the attachment interface may be any type of interface mechanism that would enable a secure attachment of the tray component to a support platform.

As noted above, the camera mount includes a tray that receives the camera, but it does not envelop the camera. The tray incorporates elements for attaching a retaining component and elements for attaching to a primary external supporting member.

When the retaining component is engaged, it presses the camera into the tray, and the camera is thus prevented from falling out regardless of how the tray is oriented when attached to the external supporting object.

In one embodiment, the camera is placed into the tray and the retaining component, in the form of an elastic strap, pulls across the tray to make contact with the camera.

The features on the tray for engagement of the strap may take the form of hooks which would fit into appropriately placed openings on the strap.

The tray itself may have elements, such as threads, common for use with photographic supports such as tripods, etc.

A camera mount includes a lower mount component comprising a rigid tray; and an elastic retaining member, fastened to the tray such that it arches over the tray cavity.

The attachment method of the elastic retaining member may include one or more hook features extruding from the tray and a corresponding number of openings integral to the elastic member.

The elastic retaining member may have integrated flaps extruding in directions essentially perpendicular to the direction in which the elastic retaining member has its greatest length.

The tray may incorporate one or more internal threads.

The hook features may have unequal angles and depths of engagement with regards to each other.

At least one end of the elastic member may be fastened to the tray using screws or rivets.

The elastic retaining member may have integrated flaps extruding in directions essentially perpendicular to the direction in which the elastic retaining member has its greatest length.

The tray may incorporate one or more internal threads.

One end of the strap may be attached to the tray using a hook feature extruding from the tray and an opening integral to the elastic member.

A camera mount includes a camera receiving portion having a first end and a second end and a restraining band; the restraining band being attached to the first end of the camera receiving portion and being detachably attached to the second end of the camera receiving portion.

The restraining band may be elastic.

The camera receiving portion may include a mounting interface for connecting to a camera support mount.

The camera receiving portion may include a recessed portion for receiving a camera.

The camera receiving portion may include a mounting interface for connecting to a camera support mount and a recessed portion for receiving a camera, the mounting interface and the recessed portion being located on opposing surfaces of the camera receiving portion.

The restraining band may include shade projections.

The restraining band may include a first opening for attaching to the first end of the camera receiving portion and a second opening for attaching to the second end of the camera receiving portion.

The second opening may be configured to allow opening and closing of a cable-port access door of the camera while the restraining band component is engaged with the camera receiving portion.

The second end of said camera receiving portion may include a hook for engaging the second opening of the restraining band to attach the second end of the camera receiving portion to the restraining band.

The hook may include a locking clamp for creating more strain upon the restraining band when in a closed state and for reducing strain upon the restraining band when in an opened state.

The locking clamp may be located within the second opening of the restraining band when in a closed state.

A camera mount includes a camera receiving portion having a first end and a second end and a restraining band; the restraining band being detachably attached to the first end of the camera receiving portion and being detachably attached to the second end of the camera receiving portion.

The restraining band may be elastic.

The camera receiving portion may include a mounting interface for connecting to a camera support mount.

The camera receiving portion may include a recessed portion for receiving a camera.

The camera receiving portion may include a mounting interface for connecting to a camera support mount and a recessed portion for receiving a camera, the mounting interface and the recessed portion being located on opposing surfaces of the camera receiving portion.

The restraining band may include shade projections.

The restraining band may include a first opening for attaching to the first end of the camera receiving portion and a second opening for attaching to the second end of the camera receiving portion.

The second opening may be configured to allow opening and closing of a cable-port access door of the camera while the restraining band component is engaged with the camera receiving portion.

The second end of said camera receiving portion may include a hook for engaging the second opening of the restraining band to attach the second end of the camera receiving portion to the restraining band.

The hook may include a locking clamp for creating more strain upon the restraining band when in a closed state and for reducing strain upon the restraining band when in an opened state.

The locking clamp may be located within the second opening of the restraining band when in a closed state.

Figure 11:
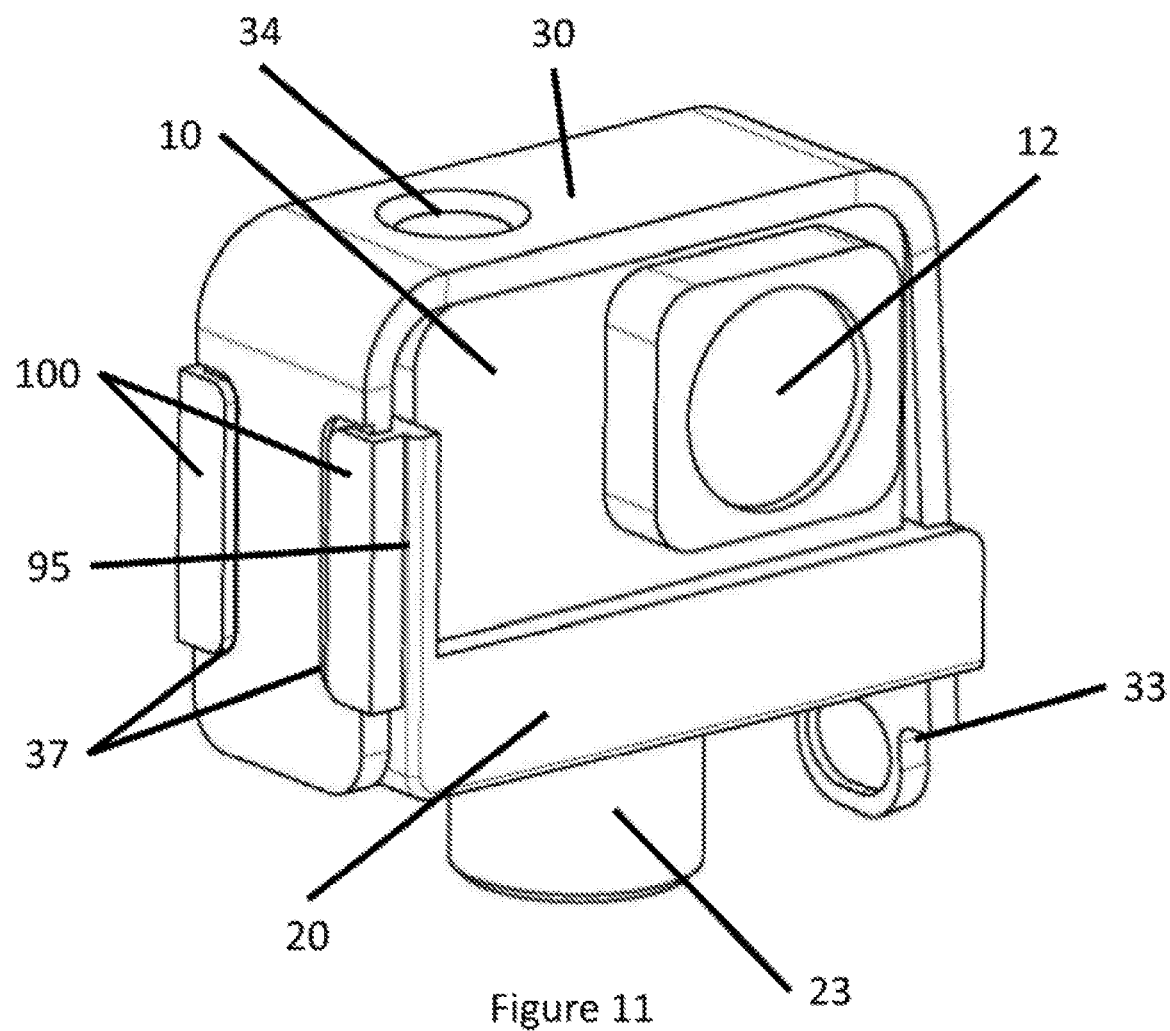
FIG. 11 illustrates a fourth embodiment of a camera mount for a compact camera.

FIG. 11 illustrates a fourth embodiment of a camera mount for a compact camera. As illustrated in FIG. 11, the camera mount includes a tray component 20. It is noted that the tray component 20 may be rigid. The tray component 20 includes, at a first end, a fin attachment mechanism 95 that includes fins 100, and at a second end, a hook (not shown). The fin attachment mechanism 95 may be integral to the tray component 20, or the fin attachment mechanism 95 may be attachable/detachable the tray component 20.

As illustrated in FIG. 11, the tray component 20 also includes attachment thread 23. It is noted that the attachment thread 23 may be replaced with other conventional interfaces that would allow the camera mount to attach to a conventional camera support mount, such as a ball head or a flat plate of a conventional tripod or conventional scaffold.

The camera mount additionally includes retaining component 30. It is noted that the retaining component 30 may be constructed of an elastic material and be configured in the form of a strap. The retaining component 30 also includes a pull-tab 33 at a first end. The pull-tab 33 may be optionally formed with a gripping feature (topography).

At a second end of the retaining component 30, retaining component 30 includes indents or recesses 37 that interact with the fins 100 of the fin attachment mechanism 95 so that the retaining component 30 is securely attached thereto and to the tray component 20.

The retaining component 30 may include one or more relief features 34, as illustrated in FIG. 10, to aid in identifying the positions of operating elements of the camera 10.

Figure 12:
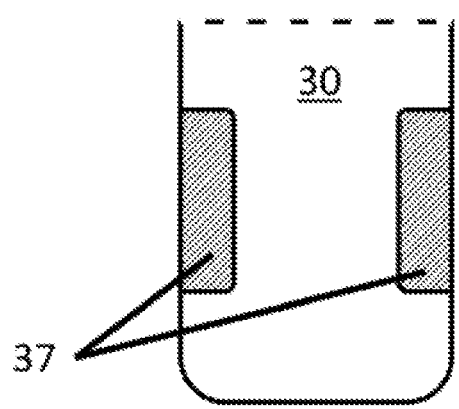
FIG. 12 illustrates a end of the retaining component for interacting with fin attachment mechanisms.

As illustrated in FIG. 12, the second end of the retaining component 30 includes indents or recesses 37, wherein the indents or recesses are shaped to correspond to the shape the fins 100 of the fin attachment mechanism 95; i.e., a D-shape as illustrated. It is noted that the indents or recesses 37 and the shape of the fins 100 of the fin attachment mechanism 95 may be any shape that allows a secure engagement between the components.

It is further noted that the indents or recesses 37 do not go through the entire depth of the retaining component 30 so that a portion of the retaining component 30, forming the bottom of the indents or recesses 37, can interact with a bottom (inner) portion of the fins 100 of the fin attachment mechanism 95.

Figure 13:
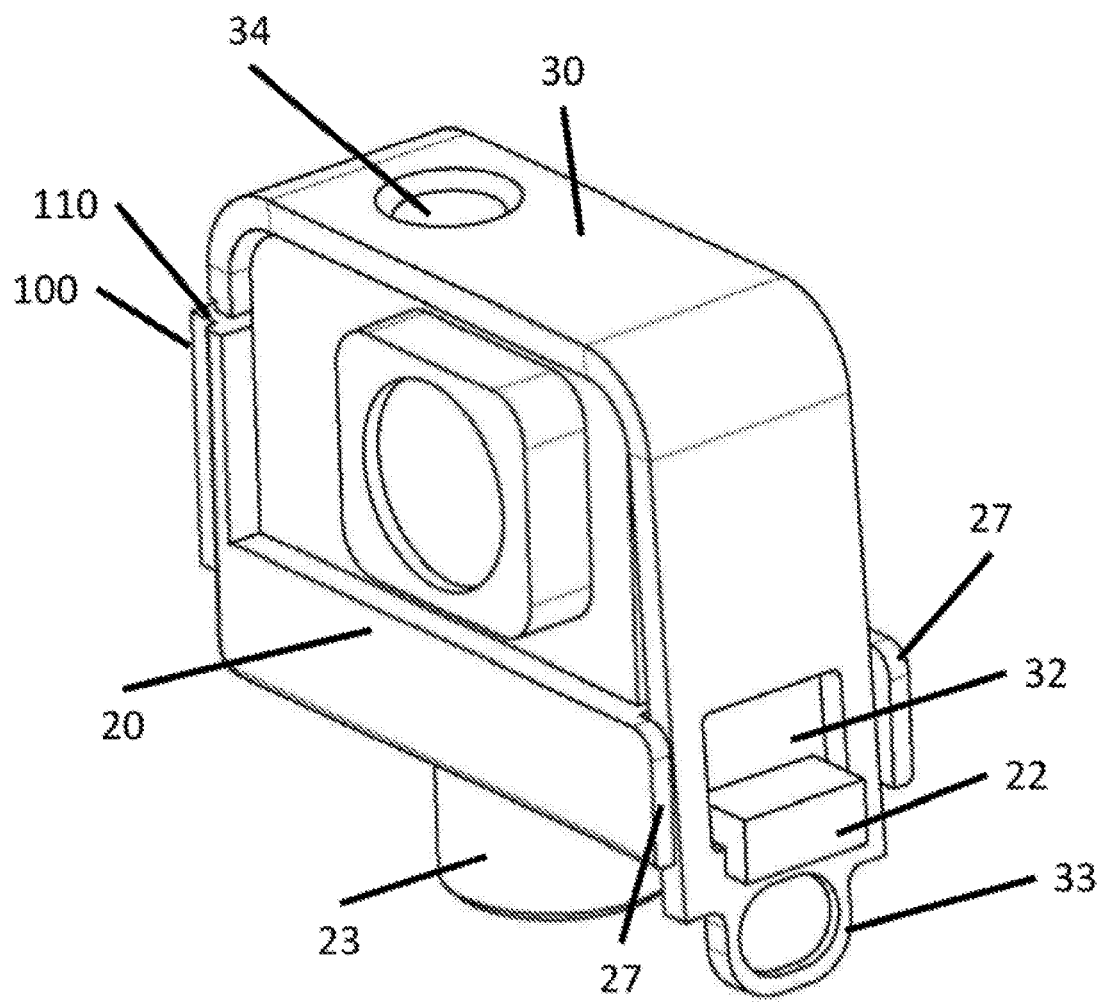
FIG. 13 illustrates another perspective of the fourth embodiment of a camera mount for a compact camera.

As illustrated in FIG. 13, the first end of the retaining component 30 includes an opening 32 that interacts with a hook 22 to provide an attachment mechanism between the retaining component 30 and the tray component 20. The tray component 20 further includes side guides 27 to provide additional interaction between the retaining component 30 and the tray component 20 to provide the attachment mechanism between the retaining component 30 and the tray component 20.

Figure 14:
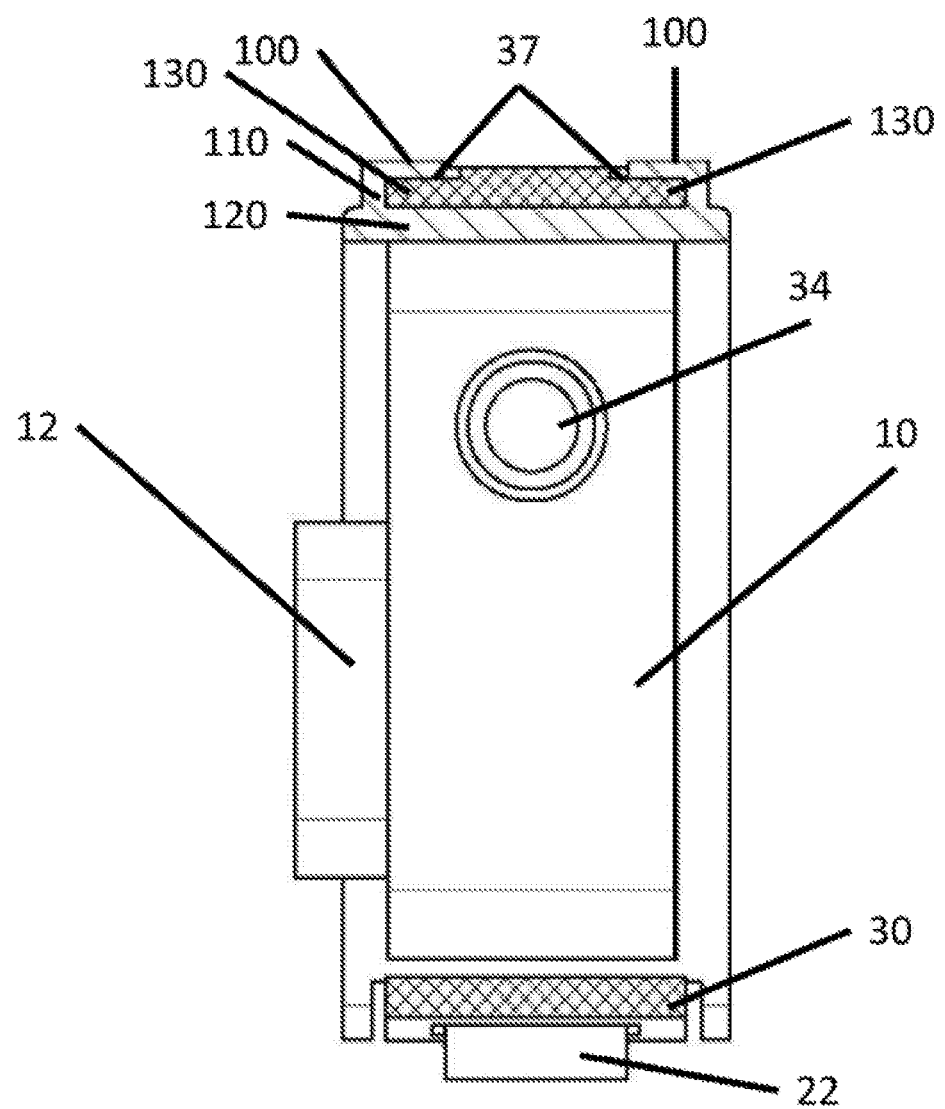
FIG. 14 illustrates a top perspective of the fourth embodiment of a camera mount for a compact camera.

FIG. 14 illustrates a top perspective of the fourth embodiment of a camera mount for a compact camera. As illustrated in FIG. 14, the fin attachment mechanism includes fins 100, projections 110, and a back portion 120. The projections 110 are orthogonal or substantially orthogonal to the back portion 120. Moreover, the fins 100 are parallel or substantially parallel to the back portion 120 and are orthogonal or substantially orthogonal to the projections 110.

The fins 100, projections 110, and a back portion 120 form channels 130, wherein the bottoms of the indents or recesses 37 of the retaining component 30 engaged the fins 100 to provide an attachment mechanism between the retaining component 30 and the tray component 20.

Figure 15:
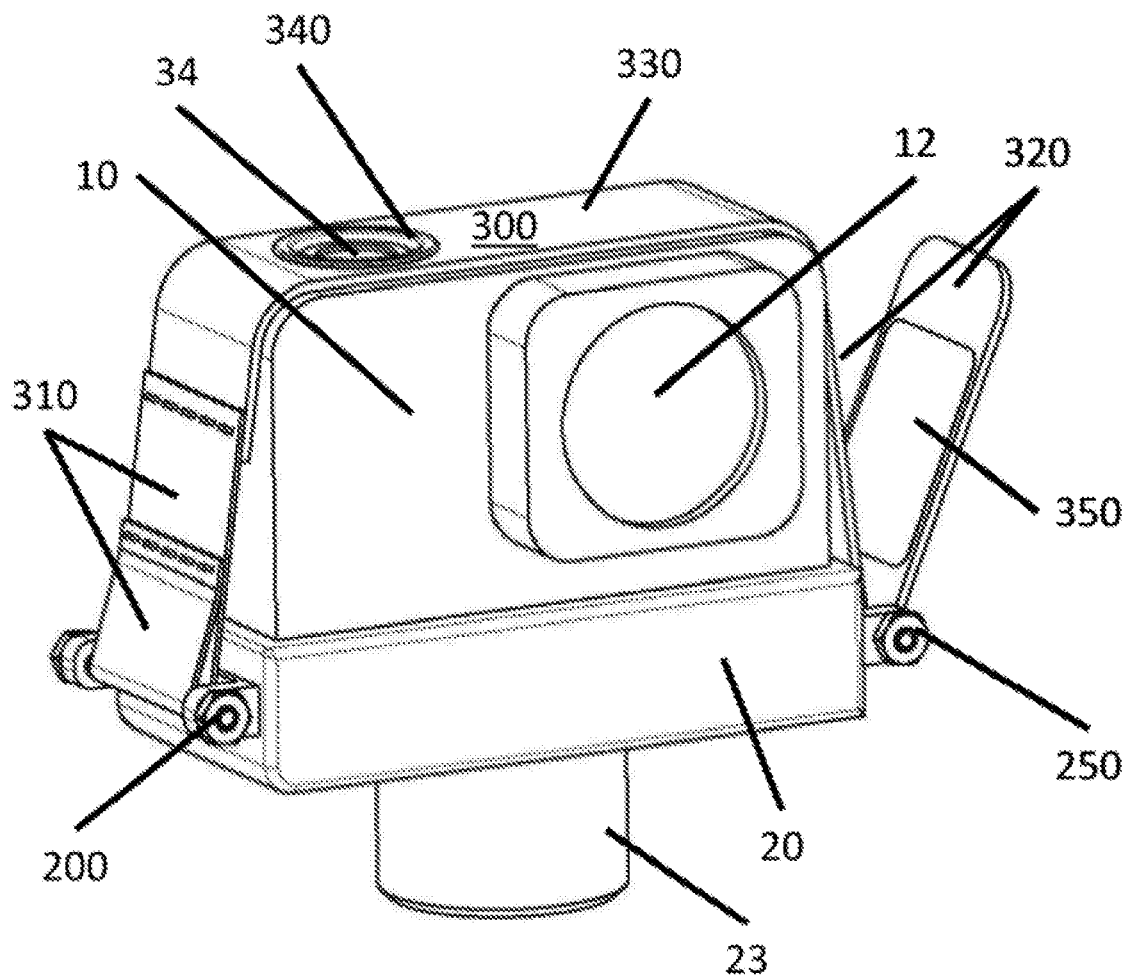
FIG. 15 illustrates a fifth embodiment of a camera mount for a compact camera.

FIG. 15 illustrates a fifth embodiment of a camera mount for a compact camera. As illustrated in FIG. 15, the camera mount includes a tray component 20. It is noted that the tray component 20 may be rigid. The tray component 20 includes, at a first end, a first anchor member 200, which, as illustrated, may include a pin and bolts to enable the connection of a first end 310 of a retaining component 300 to the tray component 20.

The first end 310 of the retaining component 300 may be constructed of an elastic material that is wrapped around the first anchor member 200 and attached to itself to realize the attachment of the first end 310 of the retaining component 300 to the tray component 20.

The retaining component 300 may include a middle portion 330 that includes one or more relief features 34, as illustrated in FIG. 15, to aid in identifying the positions of operating elements of the camera 10. The relief features 34 may be reinforced by a grommet 340.

The middle portion 330 of the retaining component 300 may be constructed of a fabric or an elastic material.

As illustrated in FIG. 15, the tray component 20 also includes attachment thread 23. It is noted that the attachment thread 23 may be replaced with other conventional interfaces that would allow the camera mount to attach to a conventional camera support mount, such as a ball head or a flat plate of a conventional tripod or conventional scaffold.

The tray component 20 also includes, at a second end, a second anchor member 250, which, as illustrated, may include a pin and bolts to enable the connection of a second end 320 of the retaining component 300 to the tray component 20.

The second end 320 of the retaining component 300 may be constructed of a fabric material or an elastic material. Also, the second end 320 of the retaining component 300 may include an attachment mechanism 350 that allows the second end 320 of the retaining component 300 to attach to itself. The attachment mechanism 350 may be a hook and latch system or a snap system.

It is noted that FIG. 15 illustrates the second end 320 of the retaining component 300 not attach to itself.

The second end 320 of the retaining component 300 is wrapped around the second anchor member 200 and attached to itself to realize the attachment of the second end 320 of the retaining component 300 to the tray component 20.

At a second end of the retaining component 30, retaining component 30 includes indents or recesses 37 that interact with the fins 100 of the fin attachment mechanism 95 so that the retaining component 30 is securely attached thereto and to the tray component 20.

Figure 16:
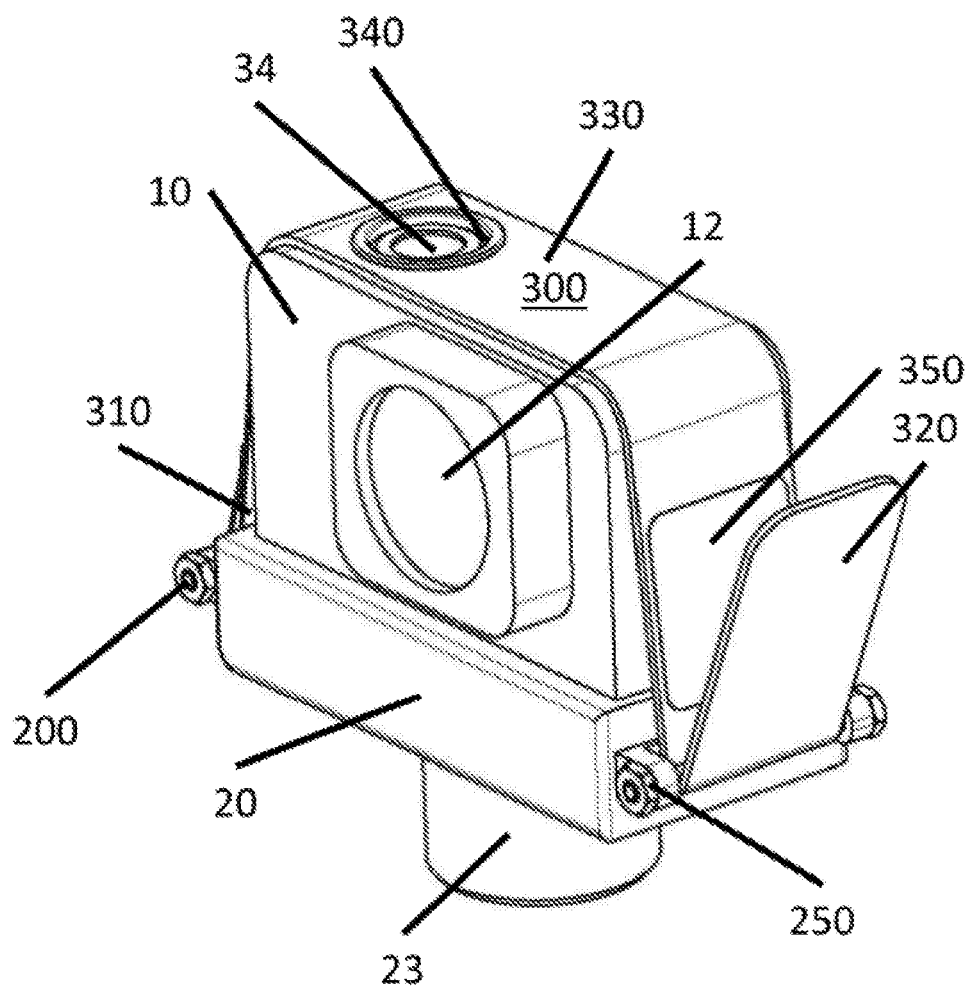
FIG. 16 illustrates another perspective of the fifth embodiment of a camera mount for a compact camera.

FIG. 16 illustrates another perspective of the fifth embodiment of a camera mount for a compact camera. As illustrated in FIG. 16, the camera mount includes a tray component 20. It is noted that the tray component 20 may be rigid. The tray component 20 includes, at a first end, a first anchor member 200, which, as illustrated, may include a pin and bolts to enable the connection of a first end 310 of a retaining component 300 to the tray component 20.

The first end 310 of the retaining component 300 may be constructed of an elastic material that is wrapped around the first anchor member 200 and attached to itself to realize the attachment of the first end 310 of the retaining component 300 to the tray component 20.

The retaining component 300 may include a middle portion 330 that includes one or more relief features 34, as illustrated in FIG. 16, to aid in identifying the positions of operating elements of the camera 10. The relief features 34 may be reinforced by a grommet 340.

The middle portion 330 of the retaining component 300 may be constructed of a fabric or an elastic material.

As illustrated in FIG. 16, the tray component 20 also includes attachment thread 23. It is noted that the attachment thread 23 may be replaced with other conventional interfaces that would allow the camera mount to attach to a conventional camera support mount, such as a ball head or a flat plate of a conventional tripod or conventional scaffold.

The tray component 20 also includes, at a second end, a second anchor member 250, which, as illustrated, may include a pin and bolts to enable the connection of a second end 320 of the retaining component 300 to the tray component 20.

The second end 320 of the retaining component 300 may be constructed of a fabric material or an elastic material. Also, the second end 320 of the retaining component 300 may include an attachment mechanism 350 that allows the second end 320 of the retaining component 300 to attach to itself. The attachment mechanism 350 may be a hook and latch system or a snap system.

It is noted that FIG. 16 illustrates the second end 320 of the retaining component 300 not attach to itself.

The second end 320 of the retaining component 300 is wrapped around the second anchor member 200 and attached to itself to realize the attachment of the second end 320 of the retaining component 300 to the tray component 20.

At a second end of the retaining component 30, retaining component 30 includes indents or recesses 37 that interact with the fins 100 of the fin attachment mechanism 95 so that the retaining component 30 is securely attached thereto and to the tray component 20.

It is noted that the embodiments illustrated in FIG. 8 through FIG. 16 may include integral retaining component flap features to block unwanted stray light from falling on the lens or viewfinder of the camera.

It is further noted that the embodiments illustrated in FIG. 8 through FIG. 16 may include non-integral flap features to block unwanted stray light from falling on the lens or viewfinder of the camera.

As noted above, camera mount includes a camera receiving portion having a first end and a second end and a restraining band; the restraining band being detachably attached to the first end of the camera receiving portion and being detachably attached to the second end of the camera receiving portion; the restraining band having a first end for detachably attaching to the first end of the camera receiving portion and a second end for detachably attaching to the second end of the camera receiving portion; the first end of the restraining band having recesses; the first end of the camera receiving portion having channels to receive the recesses of the first end of the restraining band.

The second end of the restraining band may have an opening, and the second end of the camera receiving portion may have a hook to engage the opening of the second end of the restraining band.

The second end of the restraining band may have a self-attachment mechanism and the second end of the camera receiving portion may have an anchor to provide a wrapping pivot point for the second end of the restraining band to enable the second end of the restraining band to attach to itself using the self-attachment mechanism.

The self-attachment mechanism may be a hook and latch system. The self-attachment mechanism may be a snap system. The restraining band may be constructed of an elastic portion and a fabric portion. The restraining band may be constructed of elastic.

The restraining band may have integrated flaps extruding in directions essentially perpendicular to the direction in which the restraining band has its greatest length. The flaps may be non-integral to the restraining band, but are secured in position by the restraining band.

A camera mount includes a camera receiving portion having a first end and a second end and a restraining band; the restraining band being attached to the first end of the camera receiving portion and being attached to the second end of the camera receiving portion; the restraining band having a first end for attaching to the first end of the camera receiving portion and a second end for attaching to the second end of the camera receiving portion; the first end of the camera receiving portion having an anchor to provide a wrapping pivot point for the first end of the restraining band to enable the first end of the restraining band to attached to itself.

The second end of the restraining band may have an opening, and the second end of the camera receiving portion may have a hook to engage the opening of the second end of the restraining band.

The second end of the restraining band may have a self-attachment mechanism, and the second end of the camera receiving portion may have an anchor to provide a wrapping pivot point for the second end of the restraining band to enable the second end of the restraining band to attach to itself using the self-attachment mechanism.

The self-attachment mechanism may be a hook and latch system. The self-attachment mechanism may be a snap system. The restraining band may be constructed of an elastic portion and a fabric portion. The restraining band may be constructed of elastic.

The restraining band may have integrated flaps extruding in directions essentially perpendicular to the direction in which the restraining band has its greatest length. The flaps may be non-integral to the restraining band, but are secured in position by the restraining band.

The second end of the restraining band may have recesses, and the second end of the camera receiving portion may have channels to receive the recesses of the second end of the restraining band.

In the various embodiments described above, although the component being securely mounted has been described as being a camera, the component being securely mounted can be any electronic component or electronic device, such a speaker, a cellphone, a smartphone, a navigation device, etc.

A camera mount comprises a lower mount component comprising a rigid tray; and an elastic retaining member fastened to the tray such that it arches over the tray cavity; the elastic retaining member including a first relief indentation to prevent the elastic retaining member from causing unwanted interaction with a camera.

The rigid tray may include hook features extruding from the rigid tray and the elastic retaining member includes a corresponding number of openings integral to the elastic retaining member.

The elastic retaining member may have integrated flaps extruding in directions essentially perpendicular to the direction in which the elastic retaining member has its greatest length.

The elastic retaining member may include a second relief indentation to identify a position of an operating element of a camera.

The elastic retaining member may be attached to a first end of the rigid tray and is detachably attached to a second end of the rigid tray.

The rigid tray may include a recessed portion for receiving a camera.

The elastic retaining member may include a first opening for attaching to a first end of the rigid tray and a second opening for attaching to a second end of the rigid tray.

The second opening may be configured to allow opening and closing of a cable-port access door of a camera while the elastic retaining member is engaged with the second end of the rigid tray.

The second end of the rigid tray may include a hook for engaging the second opening of the elastic retaining member to attach the second end of the rigid tray to the elastic retaining member; the hook including a locking clamp for creating more strain upon the elastic retaining member when in a closed state and for reducing strain upon the elastic retaining member when in an opened state; the locking clamp is located within the second opening of the elastic retaining member when in a closed state.

A camera mount comprises a camera receiving portion having a first end and a second end; and a restraining band; the restraining band being detachably attached to the first end of the camera receiving portion and being detachably attached to the second end of the camera receiving portion; the restraining band having a first end for detachably attaching to the first end of the camera receiving portion and a second end for detachably attaching to the second end of the camera receiving portion; the first end of the restraining band having recesses; the first end of the camera receiving portion having channels to receive the recesses of the first end of the restraining band.

The second end of the restraining band may have an opening; the second end of the camera receiving portion having a hook to engage the opening of the second end of the restraining band.

The second end of the restraining band may have self-attachment mechanism; the second end of the camera receiving portion having an anchor to provide a wrapping pivot point for the second end of the restraining band to enable the second end of the restraining band to attach to itself using the self-attachment mechanism.

The self-attachment mechanism may be a hook and latch system.

The self-attachment mechanism may be a snap system.

The restraining band may be constructed of an elastic portion and a fabric portion.

The restraining band may be constructed of elastic.

The restraining band may have integrated flaps extruding in directions essentially perpendicular to the direction in which the restraining band has its greatest length.

A camera mount comprises a camera receiving portion having a first end and a second end; and a restraining band; the restraining band being attached to the first end of the camera receiving portion and being attached to the second end of the camera receiving portion; the restraining band having a first end for attaching to the first end of the camera receiving portion and a second end for attaching to the second end of the camera receiving portion; the first end of the camera receiving portion having an anchor to provide a wrapping pivot point for the first end of the restraining band to enable the first end of the restraining band to attached to itself; the restraining band including a first relief indentation to prevent the restraining band from causing unwanted interaction with a camera.

The restraining band may include a second relief indentation to identify a position of an operating element of a camera.

The restraining band may have integrated flaps extruding in directions essentially perpendicular to the direction in which the restraining band has its greatest length.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A camera mount comprising:
   a lower mount component comprising a rigid tray;
   said rigid tray including a top and a bottom;
   said top of said rigid tray including a tray cavity;
   said tray cavity having a bottom surface, a first side surface substantially orthogonal to said bottom surface of said tray cavity, a second side surface substantially orthogonal to said bottom surface of said tray cavity, a third side surface substantially orthogonal to said bottom surface of said tray cavity, and a fourth side surface substantially orthogonal to said bottom surface of said tray cavity;
   said bottom surface of said tray cavity configured to engage a bottom surface of a camera;
   said bottom of said rigid tray including a tray attachment member configured to engage a camera support mount; and
   an elastic retaining member configured to fasten to said rigid tray such that said elastic retaining member arches over said tray cavity;
   said elastic retaining member configured to engage a top surface of a camera engaging said tray cavity when said elastic retaining member arches over said tray cavity;
   said elastic retaining member including a first relief indentation, having a first relief indentation bottom, configured to prevent said elastic retaining member from causing unwanted interaction with a camera and a second relief indentation, having a second relief indentation bottom, configured to identify a position of an operating element of a camera;
   said first relief indentation being coincidence to said second relief indentation;
   said rigid tray including a first end, a first side, a second side, and a second end;
   said elastic retaining member including a first opening;
   said rigid tray including a first hook, located on said bottom of said rigid tray and near said second end, projecting from said bottom of said rigid tray and configured to engage said first opening.

2. The camera mount as claimed in claim 1, wherein said elastic retaining member includes a second opening;
   said rigid tray including a second hook, located on said first end of said rigid tray, projecting from said first end of said rigid tray and configured to engage said second opening.

3. The camera mount as claimed in claim 2, wherein said second opening is configured to allow opening and closing of a cable-port access door of a camera while said elastic retaining member is engaged with said second end of said rigid tray.

4. The camera mount as claimed in claim 2, wherein said second hook includes a locking clamp for creating more strain upon said elastic retaining member when in a closed state and for reducing strain upon said elastic retaining member when in an opened state;
   said locking clamp is located within said second opening of said elastic retaining member when in a closed state.

5. The camera mount as claimed in claim 1, wherein said elastic retaining member has integrated flaps projecting in directions essentially perpendicular to the direction in which said elastic retaining member has its greatest length.

6. The camera mount as claimed in claim 1, wherein said elastic retaining member is attached to a first end of said rigid tray using screws.

7. A camera mount comprising:
   a lower mount component comprising a rigid tray;
   said rigid tray including a tray cavity configured to engage a camera and a bottom configured to engage a camera support mount; and
   an elastic retaining member configured to fasten to said rigid tray such that said elastic retaining member arches over said tray cavity;
   said elastic retaining member including a first relief indentation, having a first relief indentation bottom, configured to prevent said elastic retaining member from causing unwanted interaction with a camera and a second relief indentation, having a second relief indentation bottom, configured to identify a position of an operating element of a camera;
   said first relief indentation being coincidence to said second relief indentation;
   said rigid tray including a first end, a first side, a second side, and a second end;
   said elastic retaining member including a first end, a second end and an opening located at said first end of said elastic retaining member;
   said elastic retaining member including a first recess located at said second end of said elastic retaining member, said first recess having a first recess bottom and a second recess located at said second end of said elastic retaining member, said second recess having a second recess bottom;
   said first recess and said second recess of said elastic retaining member being detachably attached to said first end of said rigid tray and said opening of said elastic retaining member being detachably attached to said second end of said rigid tray;
   said first end of said rigid tray having a first channel configured to receive said first recess of said elastic retaining member and a second channel configured to receive said second recess of said elastic retaining member;
   said first channel including a first fin, a first projection, and a first back portion;
   said first back portion being substantially orthogonal to said top of said rigid tray;
   said first fin being substantially parallel to said first back portion and being configured to engage said first recess bottom to provide a detachable attachment to said elastic retaining member;
   said second channel including a second fin, a second projection, and a second back portion;
   said second back portion being substantially orthogonal to said top of said rigid tray;
   said second fin being substantially parallel to said second back portion and being configured to engage said second recess bottom to provide a detachable attachment to said elastic retaining member.

8. The camera mount as claimed in claim 7, wherein said second end of said rigid tray having a hook configured to engage said opening of said elastic retaining member.

9. The camera mount as claimed in claim 7, wherein said elastic retaining member is constructed of an elastic portion and a fabric portion.

10. The camera mount as claimed in claim 7, wherein said elastic retaining member is constructed of elastic.

11. The camera mount as claimed in claim 7, wherein said elastic retaining member has integrated flaps projecting in directions essentially perpendicular to the direction in which said elastic retaining member has its greatest length.

12. A camera mount comprising:
a lower mount component comprising a rigid tray;
said rigid tray including a top and a bottom;
said top of said rigid tray including a tray cavity;
said tray cavity having a bottom surface, a first side surface substantially orthogonal to said bottom surface of said tray cavity, a second side surface substantially orthogonal to said bottom surface of said tray cavity, a third side surface substantially orthogonal to said bottom surface of said tray cavity, and a fourth side surface substantially orthogonal to said bottom surface of said tray cavity;
said bottom surface of said tray cavity configured to engage a bottom surface of a camera;
said bottom of said rigid tray including a tray attachment member configured to engage a camera support mount; and
an elastic retaining member configured to fasten to said rigid tray such that said elastic retaining member arches over said tray cavity;
said elastic retaining member configured to engage a camera engaging said tray cavity when said elastic retaining member arches over said tray cavity;
said elastic retaining member including a first relief indentation, having a first relief indentation bottom, configured to prevent said elastic retaining member from causing unwanted interaction with a camera and a second relief indentation, having a second relief indentation bottom, configured to identify a position of an operating element of a camera;
said first relief indentation being coincidence to said second relief indentation;
said rigid tray including a first end, a first side, a second side, and a second end;
said elastic retaining member including a first end and a second end;
said second end of said elastic retaining member having a self-attachment mechanism;
said second end of said rigid tray having an anchor configured to provide a wrapping pivot point for said second end of said elastic retaining member to enable said second end of said elastic retaining member to attach to itself using said self-attachment mechanism.

13. The camera mount as claimed in claim 12, wherein said self-attachment mechanism is a hook and latch system.

14. The camera mount as claimed in claim 12, wherein said self-attachment mechanism is a snap system.

* * * * *